United States Patent [19]

Barraud et al.

[11] 4,017,660

[45] Apr. 12, 1977

[54] DIELECTRIC MATERIAL HAVING MONOMOLECULAR LAYERS AND CAPACITORS IN WHICH SAID MATERIAL IS EMPLOYED

[75] Inventors: André Barraud, Bures sur Yvette; Jean Messier, Gif sur Yvette, both of France

[73] Assignee: Commissariat a l'Energie Atomique, Paris, France

[22] Filed: Sept. 29, 1975

[21] Appl. No.: 617,724

[30] Foreign Application Priority Data

Oct. 8, 1974 France .............................. 74.33850

[52] U.S. Cl. .................................. 428/411; 252/63; 252/63.2; 252/64; 260/413; 428/457
[51] Int. Cl.² ................................................ B32B 9/04
[58] Field of Search .................... 252/63, 63.2, 64; 260/413; 428/457, 411

[56] References Cited

UNITED STATES PATENTS

| 1,996,392 | 4/1935 | Torrence et al. | 428/457 |
|---|---|---|---|
| 2,019,336 | 10/1935 | Clark | 252/64 |
| 2,475,592 | 7/1949 | Clark | 252/64 X |
| 2,810,770 | 10/1957 | Sanford et al. | 252/63 X |
| 3,113,253 | 12/1963 | Ishikawa et al. | 428/411 X |
| 3,243,674 | 3/1966 | Ebert | 252/64 X |
| 3,571,491 | 3/1971 | Markowski | 252/64 X |

*Primary Examiner*—Marion E. McCamish
*Attorney, Agent, or Firm*—William D. Stokes

[57] ABSTRACT

The dielectric material is constituted by monomolecular layers of an organic substance, the molecules of which have a long aliphatic chain terminating in a hydrophilic group. The substance is selected from the group in which a lateral group is grafted onto the aliphatic chain and is capable of exchanging a hydrogen bond with an identical adjacent molecule.

9 Claims, No Drawings

DIELECTRIC MATERIAL HAVING MONOMOLECULAR LAYERS AND CAPACITORS IN WHICH SAID MATERIAL IS EMPLOYED

The present invention is concerned with dielectric material provided with organic monomolecular layers and with products in which material of this type is employed, especially capacitors.

It is known that organic monomolecular layers deposited by the Langmuir-Blodgett method constitute an excellent dielectric both in regard to uniformity of thickness and in regard to dielectric strength. The molecules usually employed for the formation of these films are either stearic acid ($C_{17}H_{35}COOH$) and the metal salts of said acid or behenic acid ($C_{21}H_{43}COOH$) and the metal salts of said acid.

These layers suffer, however, from lack of lateral cohesion due to the weakness of the intermolecular bonds. The dielectric is consequently subject to a certain number of disadvantages in regard to :

a. its thermal resistance : the monolayers constituted by a salt of the fatty acids mentioned above fuse at about 125° C and rapidly deteriorate at 100° C (this is the case, for example, with films of calcium behenate) ;

b. its voltage resistance : for a film to be of value from an industrial standpoint, it must be capable of withstanding an operating voltage of 1 V per layer over a temperature range of $-50°$ C to $+125°$ C, which is very difficult to obtain with films of this type.

The present invention is precisely directed to dielectric material of the same type but improved by means of intermolecular hydrogen bonds which are added to the cohesion forces of the Van der Waals type and endow the film with enhanced cohesion. Use is accordingly made of substances in which the molecules possess a long aliphatic chain terminating in a hydrophilic group ; this is the case in particular of the stearic and behenic acids which are known in this application but possess in addition a lateral group which is capable of exchanging a hydrogen bond with the lateral group of an adjacent molecule . The result thereby achieved in comparison with known materials of the same type is an increase in the melting point and improved resistance to stresses, in particular to thermal and creep stresses.

In more precise terms, this invention relates to a dielectric material of the type consisting of monomolecular layers of an organic substance in which the molecules have a long aliphatic chain terminating in a hydrophilic group, said substance being essentially selected from the group in which the molecule has in addition a lateral group grafted onto said aliphatic chain and capable of exchanging a hydrogen bond with an identical adjacent molecule.

In general, the aliphatic chain has a hydrophobic character and the molecules employed in the invention are therefore amphiphilic.

Preferably the hydrophilic group is one of the COOH and $CONH_2$ groups.

Preferably again the aliphatic chain to which the lateral group is grafted has the formula :

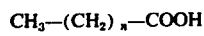

$CH_3-(CH_2)_n-COOH$

Preferably again the number $n$ is within the range of 18 to 30 with a preferred value in the vicinity of $n = 22$.

Preferably again the lateral group which is capable of exchanging a hydrogen bond is fixed in the $\alpha$ position of the hydrophilic function but could also be fixed in the $\beta$ position.

Preferably again the lateral group is the OH group or the SH group.

For the description of the particular properties of the material according to the invention and solely by way of non-limitative explanation, reference will be made hereinafter to the particular material obtained by employing $\alpha$-hydroxy-behenic acid ($n$ 32 20) obtained by grafting the alcohol function in the $\alpha$ position of the acid function. But equivalent results are obtained in the case of the other substances of the family defined in the foregoing, for example with $\alpha$-hydroxy-tetracosanoic acid ($n = 22$).

The films formed by the molecules of $\alpha$-hydroxy-behenic acid deposited on an insulating or conducting substrate are highly uniform and compact. From the point of view of thermal resistance, a substantial improvement is observed in comparison with films of the prior art : whereas the material obtained with behenic acid normally melts at 90° C, the layers of $\alpha$-hydroxy-behenic acid attached to an aluminum substrate are stable up to 140° C. This property is specific to extremely thin films having strong lateral bonds. In fact, an ordinary film of behenic acid which has a melting temperature of 90° C and in which the lateral bond forces are only weak Van der Waals forces suffers degradation at a temperature below 80° C. The salts of this acid which fuse at a higher temperature (of the order of 127° C) do not readily permit operation at 100° C.

In regard to the mechanical strength and more particularly the resistance to creep deformation which occurs under the action of electrostatic pressure and is the cause of early breakdown of capacitors, said creep deformation does not take place with this novel material and intrinsic breakdown of capacitors constructed with this material is observed without any preliminary increase in the leakage current.

The monomolecular films in accordance with the invention which are formed at the surface of water are highly compact as has been proved by analytical tests carried out by the present Applicant. It is possible to apply over 50 dynes/cm on molecules of $C_{22}$ and more than 40 dynes/cm on molecules of $C_{18}$.

The dielectric material in accordance with the invention is particularly well suited to the construction of electrical components which call for the presence of a dielectric layer and especially capacitors. Capacitors of this type have been fabricated by the present Applicant by making use in particular of aluminum substrates. The observed breakdown voltages are higher than those obtained with ordinary layers : by way of example, a breakdown voltage of over 9 V is obtained in the case of five monomolecular layers and a range of $-50°$ C to $+140°$ C, thus permitting operating voltages of 5 V, for example.

Structures of this type withstand heat treatments of 500 h at 140° C in vacuo. Dielectric losses are of the order of tg $\Delta < 3 \times 10^{-3}$.

What we claim is:

1. A dielectric material of the type having monomolecular layers of an organic substance consisting of: molecules formed of a long aliphatic chain of formula $CH_3-(CH_2)_n$ wherein $n$ is within the range of 18 to 30, and terminating in a hydrophilic group; and means for cohering said molecules including a plurality of lateral groups each grafted onto each of said aliphatic molecules, whereby pairs of said lateral groups cooperate together for bonding of adjacent molecules.

2. A dielectric material according to claim 1, wherein said hydrophilic group is a $CONH_2$ group.

3. A dielectric material according to claim 1, wherein each of said lateral groups is attached in the $\alpha$ position of said hydrophilic group.

4. A dielectric material according to claim 1, wherein each of said lateral groups is attached to the $\beta$ position of said hydrophilic group.

5. A dielectric material according to claim 1, wherein said lateral groups are OH groups.

6. A dielectric material according to claim 1, wherein said lateral groups are SH groups.

7. A dielectric material according to claim 1, wherein the organic substance is $\alpha$-hydroxy-behenic acid.

8. A dielectric material according to claim 1, wherein the substance is $\alpha$-hydroxy-tetracosanoic acid.

9. A dielectric material according to claim 1, and further including means fabricating said material into a capacitor.

* * * * *